United States Patent Office 2,952,540
Patented Sept. 13, 1960

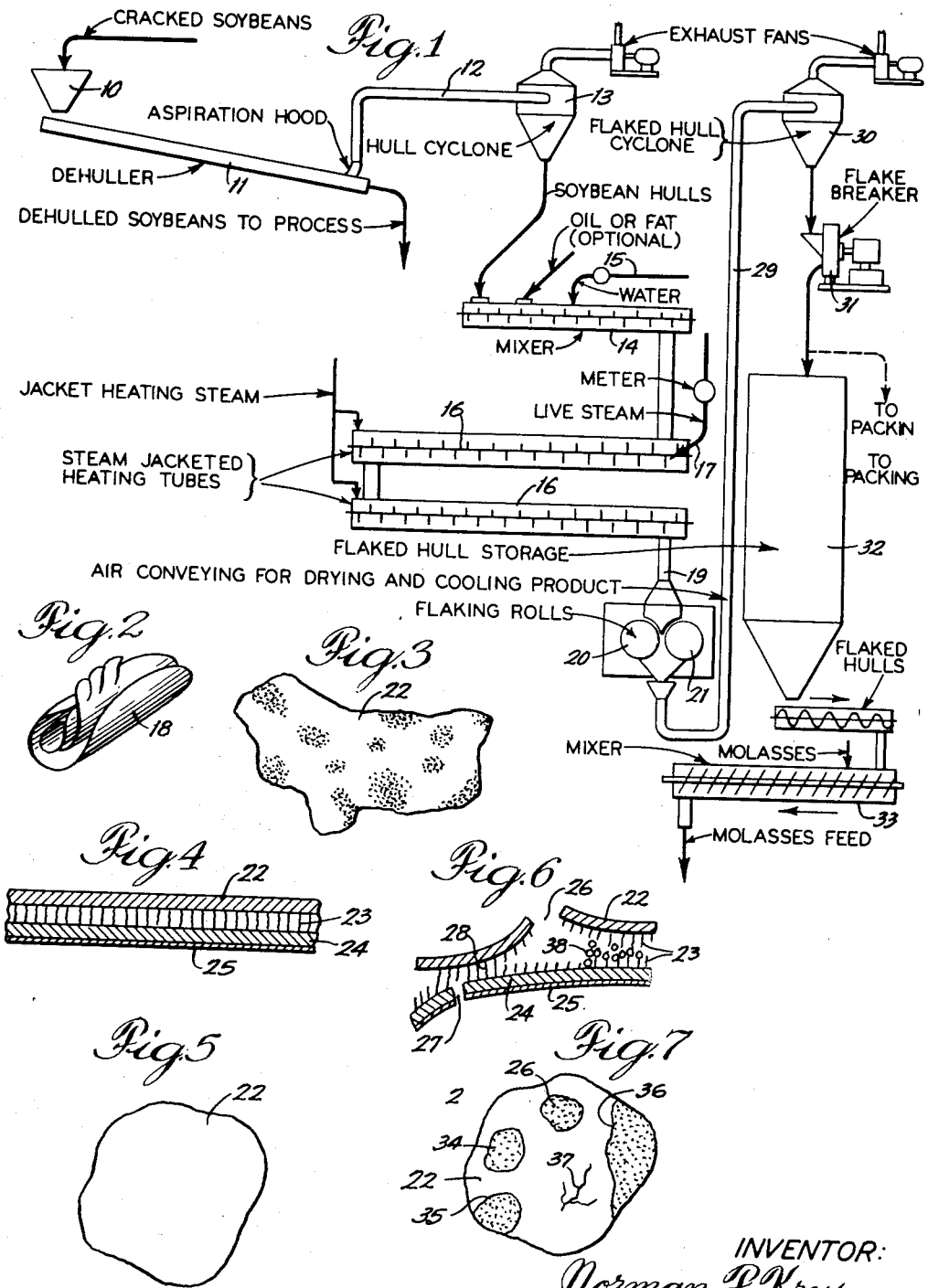

2,952,540

FIBROUS FLAKED PRODUCT

Norman F. Kruse, Decatur, Ind., assignor to Central Soya Company, Inc., Fort Wayne, Ind., a corporation of Indiana Filed Apr. 19, 1957, Ser. No. 654,033

6 Claims. (Cl. 99—2)

This invention relates to a fibrous flaked product and more particularly to a feed flake formed from hulls and other high fiber feed materials.

This application is a continuation-in-part of my copending application, Serial No. 596,330, now Patent No. 2,904,435, for Preparation of Flaked Hull Product.

High fiber materials such as soybean hulls, oat hulls, malt sprouts, brewer's yeast, grain screenings, weed seeds, pods, etc., are generally unsuitable for use in livestock feed because the nutritious material therein is encased within relatively non-digestible cellulose capsule, and further when such material is ground, the product is too dense and dusty for use in feed formulations. For example, soybean hulls are generally cup-shaped and have a protective wax coating which tends to make the cup shape of the hull persistent even after severe processing, while at the same time preventing the material from being absorptive of liquid additives. The wax-coated hull, like other feed hulls, remains stiff and coarse and unsuitable for feed formulations. If it were possible to convert such materials into a porous, spongy, absorbent material which could receive liquid feed ingredients while at the same time rendering the nutritive portions of the high fiber material accessible to digestive juices, a substantial advance would be achieved, rendering such high fiber material highly useful in feed formulations. I have discovered that hulls and like high fiber material can be treated so as to provide effective apertures through which the nutritious portion of the material is made accessible to digestive juices while at the same time creating in such material increased capillarity for bringing about effective absorption of liquid feed ingredients therein and without preventing the resulting material from being free flowing and readily handled.

An object of the present invention is to provide a high fiber feed material having the above described desirable characteristics. A further object is to convert hulls and other high fiber materials into a material of low bulk density having a high capacity for absorbing liquid feed ingredients, the resulting feed material, after absorbing such liquids, presenting outer dry surfaces and being free flowing. Yet another object is to provide a hull or other high fiber material which is so treated as to provide ready access for digestive juices within the nutritive portion of the flake material while at the same time preserving the original cellular organization of the hull, etc. but with the palisade and aleurone layers ruptured and the hour-glass cells collapsed to provide narrowed capillary passages between the palisade and aleurone cell layers. Yet another object is to provide a fibrous flaked product having cell layers including palisade, hour-glass and aleurone cell layers, the nutritive aleurone cells not being readily digestible because of their encasement by protective waxes, hemicelluloses and celluloses in their original form, said palisades and aleurone layers being fractured and said hour-glass cells therebetween being torn, collapsed and exposed, and the cell layers of the flake being flattened to provide thin capillary passages between the palisade and the aleurone layers, whereby effective absorption of liquid feed ingredients is obtained without interfering with the free-flowing character of the flakes. Other specific objects and advantages will appear as the specification proceeds.

The invention may be shown in an illustrative manner by the accompanying drawing, in which—

Figure 1 is a diagrammatic view of apparatus illustrating the method which may be employed in the practice of my invention; Fig. 2, a perspective view of a curled soybean hull before it reaches the flaking machine; Fig. 3, a plan view of a flake formed by the flaking rolls and showing the flake impregnated with a liquid feed ingredient; Fig. 4, a broken sectional view, on a highly magnified scale, of a portion of the hull; Fig. 5, a plan view of the hull particle shown in Fig. 4; Fig. 6, a sectional view of a portion of the hull flake after leaving the flaking machine; and Fig. 7, a plan view of the ruptured flake structure shown in Fig. 6.

For the purpose of simplicity, the invention herein will be described in connection with a soybean hull, it being understood that the process may be similarly employed with other types of hulls and high fiber materials.

In one embodiment of the process, the cracked soybeans, as illustrated in Fig. 1, are passed from a bin 10 into a dehuller 11 and the removed hulls are then drawn through pipe 12 into the hull cyclone 13. Since such apparatus is well known, a further detailed description is believed unnecessary. The hulls are passed from the cyclone to a mixer 14 in which water is added at 15. The moistened hulls then pass into a heat-jacketed conduit 16 and into which live steam is introduced at 17. Steam within the heated conduit tends to dissolve the wax coating of the hulls while at the same time making the material plastic. The rapid heating also destroys the urease or other undesirable enzyme activity which may be present. The steam condenses upon the hulls and thus meters moisture thereon so as to evenly coat the hulls with moisture. As a result of the steam and heat application, it is found that the hulls tend to curl into a tubular or roll shape, as indicated by the numeral 18 in Fig. 2. If desired, the steam may be omitted and the moistened hulls heated in the jacketed cooker to bring about the same result, but in the latter method a longer holding time is required.

The curled hulls pass from the conduit 16 through the pipe 19 and thence through the flaking rolls 20 and 21. The flaking rolls may be of the same size and may be run at the same speed. I prefer, however, to run one of the rolls slightly faster than the other to give a shearing action, this action on the curled hulls tending to break the hour-glass cells within the hull and to provide apertures for good liquid absorption.

As illustrated in Fig. 4, the original hull has an outer layer or epidermis (22), consisting of palisade cells which are covered on top by a waxy cuticle, a middle layer consisting of hour-glass or I-cells (23), and an inner layer (24) facing the cotyledon in the seed. This inner layer comprises the spongy parcenchyma consisting of several strata of flat boxlike cells and the aleurone cells which are filled with dense protein (aleurone). The exposed surface of the aleurone cells in the hull separated from the seed is also covered by a thin cellulose layer (25).

The plastic and curled hulls, under the action of the flaking rolls, while retaining their original cell organization, are nevertheless ruptured, as shown in Fig. 6, the outer epidermis 22 being ruptured at 26 and the hourglass cells 23 being broken apart or collapsed. The inner aleurone cell layer 24 is also ruptured at 27. The main change is in the collapsing of the hour-glass cells, and under the pressure of the flaking rolls, the palisade and aleurone layers move closer together to provide narrowed capillary passages 28. While, in the illustration given in Fig. 6, the palisade and aleurone layers are shown spaced apart for the purpose of clarity of illustration, it will be understood that in the final flake these layers are very close together so as to provide the narrowed capillary passages referred to. The narrowed passages are effective in the absorbing of liquid ingredients while at the same time the maintenance of the outer layers 22 and 24 protect and occlude these liquid ingredients within the flake, thus enabling the flake to have a relatively dry exterior and thereby to remain free flowing.

In the soybean hull, hour-glass cells gradually decrease in height in proportion to their distance from the hilum (not shown), and these cells are effective in the original tissue for storing water intracellularly between the widely-spaced component cells. The palisade layer and the cellulose cells on the exposed side of the aleurone layer represent barriers to liquid penetration. This can be demonstrated by the anisotropic behavior of these layers when viewed by a polarizing microscope. By flaking the hulls, the palisade and aleurone layers are fractured so as to form apertures through these layers, liquid can pass into the interior where the hour-glass cells have been collapsed, and the flow of such liquid is increased by the narrowing of the passages creating increased capillarity. In the operation of the rolls, there is a shear action which shifts the position of the palisade layer relative to the aleurone layer and in this operation the hour-glass cells are split or collapsed, and the narrowing of the passages between the palisade and aleurone layers is effected. The fractured structure provides the apertures to facilitate the passage of liquids into the interior of the particle, while at the same time, by preserving the original organization of cell layers, it also provides a trap that retains liquid within the hull flakes.

From the flaking rolls, the flakes may be drawn through the conduit 29 into the cyclone 30, and from thence, if desired, through a flake breaker 31 to reduce the size of the flakes, the broken product being received within the storage bin 32. From the storage bin 32, the flaked hulls may be passed through mixers 33 and liquids such as molasses or other nutritive material incorporated in the flakes.

If desired, there may be added to the hulls within the mixer 14 not only water but also oil or fat. The adding of the oil or fat, however, is not necessary, and may be omitted if desired.

After the flaking operation, the material may be cooled by allowing it to flash off the contained moisture and to drop within 20° F. of the atmospheric temperature and the cooled flakes may then be mixed with molasses or other liquids, at the lower temperature, in order to preserve freshness, desired aroma or odor of the added material.

The addition of moisture at the beginning of the operation is desirable in that the moisture, together with the rise in temperautre, tends to destroy or inactivate the urease. Ordinarily, I find that the addition of enough water to bring the moisture content to 15 to 25% is highly satisfactory, best results being obtained when the moisture content after the addition of live steam reaches 18–20%.

The steam is preferably added in an amount sufficient to give a product temperature that is effective in inactivating the urease, removing the wax or surface coating of the hulls, and producing the curling described. Ordinarily, from 10 to 15% by weight of steam is found to be sufficient, since this tends to give a product temperature of 190° to 210° F., but lower or higher temperatures may be employed depending upon the type of material being treated and depending also upon the time in which the above described treatment is being effected. The steam has a surprising effect upon the moistened hulls in that it not only makes the hull plastic in character, but also causes the hull to curl in the peculiar shape shown in Fig. 2 so that the hull, when subjected to the flaking operation, is in the nature of hull rolls or coils. When presented in this shape to the rolls, it is found that the hull loses its cup or shell shape and all identity with the original cup-shaped hull, the resulting flake being thin, wide and translucent. The coarse feel of the hull disappears and the flake has a silky or slippery feel and is compressible between the fingers. Instead of a dense rigid hull structure, the material is now fluffy, highly absorbent and translucent.

A water absorption test is often made to measure the liquid-holding capacity of feed ingredients. This test is made by adding water to a weighed portion of the ingredients until surplus water is apparent. After several minutes, the surplus water is drained off and the amount of water retained is determined. The following results show the remarkable absorptive characteristic of the new flaked soybean hull product as compared with other products:

| Sample | Bulk Density (lbs./cu.ft.) | Percent Water Absorption |
| --- | --- | --- |
| Flaked Soybean Hulls | 8 | 525 |
| Ground Hulls Before Flaking | 13 | 320 |
| Wheat Bran | 11 | 240 |
| Beet Pulp | 13 | 340 |
| Chopped Alfalfa Hay | 13 | 390 |

These tests show that the flaked soybean hulls should have excellent molasses absorption. This is the case, as this product can be used alone or combined with other ingredients to make an excellent dairy or beef feed containing from 25 to 35% molasses. The desirable qualities of having rations of high molasses content are well known to the trade.

If desired, the process may terminate at the point of discharge of the flaked hulls, as indicated by the broken conduit or line in Fig. 1, and the flaked hulls or high fiber feed materials may be discharged for packaging or storage or shipping, etc. I have found, however, as set out above, that the porous character of the product renders it exceptionally adapted for combining with molasses or other liquid nutrients. The thickness or thinness of the flake has a bearing upon the absorption of such liquid nutrients.

In the flaking of the product, flakes of from .005″–.006″ can be obtained. However, if a thicker product is desired, namely, to minimize breakage during handling, such as .01 to 0.15″, it still can be used in conventional dairy feeds, since such a product still has a molasses absorption capacity of approximately 30%. The amount of molasses may vary widely as, for example, from 5 to 40% molasses. The molasses may be sprayed upon the material during mixing, and by reason of the highly absorbent character of the flakes, it is found that air drying is sufficient to bring about the final flake product illustrated in Fig. 3.

Referring to the optional process in which oil or fat is added along with the water, it is found that the oil does not affect the molasses absorption but is useful in plasticizing the product as well as furnishing an energy value (calorific value) to the final product. I prefer to add oil or fat in the proportion of 2 to 12%, but best results have been obtained where the percentage is about 2 to 4%.

It is surprising to find that the addition of the oil or fat, which aids in the plasticizing of the hulls, does not interfere with the absorptive character of the final flakes, but, instead, a fluffy, highly absorbent finished product is obtained. I prefer to employ acidulated oils or fats because of their low cost and because of their nutritional adequacy for animal feeds. However, any suitable fat or oil may be used, as, for example, corn oil, cottonseed oil, vegetable oils and animal fats. Examples of the acidulated oils may be referred to as acidulated cottonseed oil, acidulated corn oil, mixed acid oils, etc.

The flaked hull product can be advantageously substituted for other fibrous ingredients such as alfalfa, wheat hulls, ground hulls, screenings, beet pulp, citrus pulp, etc., in commercial dairy feed formulas. It was found that the feed made with the flaked hulls had a better appearance, the same or higher bulkiness, tended to cake less in storage, and when broken apart, expanded more than presently-used commercial dairy feeds. Such a flaked product could be used, if desired, as an excellent carrier for molasses, due to its superb water-absorption capacity.

Illustrative examples of the process may be set out as follows:

*Example I*

Soybean hulls were moistened by the addition of 5% water and sufficient live steam was introduced to bring the hull temperature to approximately 200° F. and the moisture content to approximately 19%. In about 5 minutes, the operation was completed, the shells coiling upon themselves to form shell rolls, as shown in Fig. 2. These coiled hulls were then passed through flaking rolls to form flakes of approximately .005" thickness. The product was cooled by flashing off the moisture. The material thus obtained was silky, fluffy, soft, translucent, highly absorbent, and had lost all resemblance to the original material. The bulk density of this product was approximately 8 pounds per cubic foot; the water absorption under the water absorption test was found to be approximately 500%.

*Example II*

The process was carried on as described in Example I except that the final product, consisting of absorbent flakes, was combined with approximately 30% molasses and the product air dried. The solid portions of the molasses appeared as particles upon the exterior surfaces of the flakes, as illustrated by Fig. 3, giving a dry product of low bulk density and possessing excellent handling characteristics.

*Example III*

The process was carried on as described in Example I except that enough water and live steam was added to bring the moisture content of the hulls to 20% and the temperature to 210° F. The coiled or rolled hulls were then passed through flaking rolls to give a thickness of approximately .010" and a bulk density of 11 lbs. per cubic foot. After cooling, approximately 30% molasses were added to produce a final product similar to that of Example II.

Similar processes were carried on in which molasses in the proportions of 5%, 10%, 20% and 40% were added, and with comparable results.

*Example IV*

The flaked hull product as obtained in Example I or Examples II or III was substituted for beet pulp and alfalfa in a commercial dairy feed formula having the following constituents:

|  | New | Conventional |
|---|---|---|
| Beet Pulp | 9.5 | 20 |
| Bran | 23 | 24 |
| Limestone | 3 | 2 |
| Std. Midds | 1 | 5 |
| Molasses | 30 | 28 |
| Def. Phosphate | 1 | 1 |
| Salt | 1 | 1 |
| Processed Soybean Hulls | 30 |  |
| ¼" Chopped Alfalfa |  | 19 |
| Urea | 1.5 |  |
|  | 100.0 | 100. |
| Yeast Premix, lbs./ton | 1.0 | 1.0 |
| Trace Minerals, lbs./ton | 0.4 | 0.4 |

It was found that the feed made with the flaked hulls had a bulk density which was approximately the same as that of the conventional formula; that the flaked hull feed had a better appearance and tended to cake less in the bag due to the highly absorbent character of the hulls.

*Example V*

The process was carried on as described in Example I except that approximately 2% of acidulated corn oil was added. The product was a fine fluffy product, highly absorbent and comparable to the result described in Example I.

*Example VI*

The process was carried on as described in Example V, except that acidulated cottonseed oil was used in an amount equal to 4%, and the final product as comparable to that described in Example V.

Similar tests were carried on using mixed vegetable oils and mixed acid oils, and with comparable results.

*Example VII*

The process was carried on as described in Example I, except that in place of soybean hulls, oat hulls were treated as described in detail in Example I, and with comparable results.

*Example VIII*

The process was carried on as described in Example I except that in place of soybean hulls, grain screenings were employed and along with the grain screenings were weed seeds, pods, etc. It was found that the process was effective in changing the character of such material to give the soft, porous and absorbent material described in Example I.

*Example IX*

Tests were carried out to obtain bulk densities and the water-absorbing power of hulls, along with the densities and water-absorbing characteristics of other feed ingredients before and after flaking. The results as set out in the following tabulation, show that flaking increased the bulk densities and water-absorbing characteristics of the materials, and particularly those of the soybean hulls.

|  | Percent Water Absorbed | | Bulk Density, Approx. Percent Increase |
|---|---|---|---|
|  | Before Flaking | After Flaking |  |
| Soybeans Hulls | 300 | 500 | 60 |
| Beet Pulp | 412 | 542 | 25 |
| Gluten Feed | 336 | 374 | 5–10 |
| Chopped Alfalfa (¼") | 380 | 438 | 15 |

In the case of soybean hulls, it was found that after the application of water, live steam or dry heating caused the waxy coating of the hulls to disappear or to break up, and simultaneously therewith the individual hulls tended to coil into rolls. The application of pressure through the flaking rolls to the coiled material then produced a change of appearance of the hull so that it was not identifiable as such but, instead, a new flake structure appeared bearing no resemblance to the coarse, shell-like structure of the original hull; instead, the flake was soft, compressible, highly absorbent, and translucent.

In determining the absorptive capacity of the original hulls in comparison with the final flaked product, there has been employed a safranin-light green staining combination. An aqueous safranin was allowed to act on both flaked and raw hulls for an hour. The material was then washed in two or three changes of water and 30, 50, 70 and 95% ethanol. It was then stained with light green in 95% ethanol for half an hour, rinsed briefly in several changes of ethanol and stored in xylene. After this stain, the raw hulls are found to be bright scarlet, with the green stain showing up only at the edges. The flakes, by contrast, are deep green, with only occasional scattered edges of scarlet. This indicates rapid absorption of liquid by the flakes, resulting in nearly complete displacement of the red by the green, and slow absorption by the untreated hull, resulting in the green by penetrating only a short distance from the edges of the particle.

An indicator process employing dyes enables us to determine therefore the absorptive capacity of the flake after it has been modified. In the above illustration, the diffusion of the green dye in the flake, as measured by the time of its absorption and the change of color from red to blue, gives an accurate measure of the absorptive capacity of the flake.

The rapid diffusion of the green dye in the flake product appears to be brought about by the apertures in the epidermis of the hull and also by the increased capillarity caused by the flattening of the flake (the breaking of the hour-glass cells and bringing together of the palisade and aleurone layers).

The new product, as illustrated best in Figs. 6 and 7, is characterized by the fact that it preserves its original cellular organization but with the palisade and aleurone layers ruptured and the hour-glass cells collapsed to provide narrowed capillary passages between the palisade and aleurone layers. As a result, there are provided avenues of access for the digestive juices to reach the nutritive aleurone layers and further, the narrowed passages increase capillarity for the drawing into the interior of each flake of liquid feed ingredients. Thus, the retaining for the most part of the original organization of the material serves to protect the indrawn liquid such as molasses, concentrated fish solubles, or other nutritive materials, while at the same time keeping the flake material free flowing. The product is translucent, silky and slippery to the feel, spongy and when the interior of the flake is filled with molasses, or the like, the flake has a dry exterior.

The plan view of the flake, as shown in Fig. 7, shows apertures 26, 34, 35 and 36, and the palisade layer 22 has also cracks 37 formed therein. The dominant portion of the outer palisade layer 22, as well as the dominant portion of the inner layer 24 and cellulose layer 25, are intact and provide a barrier against the loss of the absorbed liquids. Further, the breaking of the hour-glass cells 23, as shown best in Fig. 6, provides fragmented enclosures or recesses into which the feed liquids may enter and be trapped. These fragments interfere with the dislodgement of the absorbed nutritive material and to retain it within the flake.

The flake breaker 31 may be used or not used, depending upon the final product. While an extremely fine material is not desired, it is often advantageous to break the flake from large sizes into relatively smaller size so as to increase absorption of liquid ingredients and to provide a finer meal product.

In Fig. 6, liquid feed ingredients are indicated for the purpose of illustration by the numeral 38.

While, in the foregoing specification, I have described the product and the preparation thereof in considerable detail for the purpose of illustrating the invention, it will be understood that such details may be varied widely by those skilled in the art without departing from the spirit of my invention.

I claim:
1. A flaked hull product impregnated with a liquid nutrient, comprising separated soybeam hull flakes having palisade, hour-glass and aleurone cell layers, the cells in general having their original organization but with the palisade and aleurone layers apertured and with the hour-glass cells cleft and collapsed and the spacing between the palisade and aleurone layers narrowed to provide capillary passages communicating with said apertures, and a liquid feed material absorbed within the capillary passages of said flakes.

2. The structure of claim 1, in which the liquid feed nutrient is interlocked with the fragmented walls of the hour-glass cells.

3. A soybean hull product, comprising separated soybean hulls having palisade, hour-glass and aleurone cell layers with their original cellular organization unchanged except that the palisade and aleurone layers are apertured and the hour-glass cells therebetween torn and collapsed and the spacing between the palisade and aleurone layers being narrowed to provide capillary passages communicating with the apertures in said palisade and aleurone layers.

4. A soybean flaked hull product, comprising separated hull flakes having palisade, hour-glass and aleurone cell layers, the cells in general having their original organization but with the palisade and aleurone layers apertured and with the hour-glass cells collapsed and the spacing between the palisade and aleurone layers narrowed to provide capillary passages communicating with said apertures.

5. A soybean flaked hull product, comprising soybean hulls separated from the soybeans and having palisade, hour-glass and aleurone cell layers, the cells in general having their original organization but with the palisade layer shifted relative to the aleurone layer to collapse the hour-glass cells and to narrow the spacing between the palisade and aleurone layers to provide capillary passages therebetween, said palisade and aleurone layers being apertured to provide communication with said capillary passages.

6. The product of claim 5 in which the hulls have a water absorption capacity of not less than 350%, a bulk density of less than 8 pounds per cubic foot, and being substantially free of urease activity.

References Cited in the file of this patent

UNITED STATES PATENTS

| | | |
|---|---|---|
| 1,199,622 | Sheppard | Sept. 26, 1916 |
| 2,172,699 | Cohn | Sept. 12, 1939 |

FOREIGN PATENTS

| | | |
|---|---|---|
| 524,963 | Great Britain | 1940 |